(12) United States Patent
Wilhelm et al.

(10) Patent No.: US 9,755,681 B2
(45) Date of Patent: Sep. 5, 2017

(54) RADIO-FREQUENCY FRONT-END AND RECEIVER

(75) Inventors: Michael Wilhelm, Mammendorf (DE); Bernd Adler, Neubiberg (DE); Mikael Bergholz Knudsen, Gistrup (DK)

(73) Assignee: Intel Mobile Communications GmbH, Neubiberg (DE)

( * ) Notice: Subject to any disclaimer, the term of this patent is extended or adjusted under 35 U.S.C. 154(b) by 1292 days.

(21) Appl. No.: 11/861,291

(22) Filed: Sep. 26, 2007

(65) Prior Publication Data

US 2009/0081979 A1 Mar. 26, 2009

(51) Int. Cl.
*H04B 1/06* (2006.01)
*H04B 7/08* (2006.01)
*H04B 1/18* (2006.01)

(52) U.S. Cl.
CPC .............. *H04B 1/18* (2013.01); *H04B 7/0805* (2013.01)

(58) Field of Classification Search
CPC .......... H04B 7/0805; H04B 1/18; H04B 1/06; H04B 1/44; H04B 1/48; H01P 1/15; H01P 1/10; H03H 7/0123; H03H 7/1766; H03H 2001/0085
USPC ....... 455/101, 272–275, 276.1, 277.1, 277.2, 455/280, 562.1, 550.1, 553.1, 90.2, 552.1, 455/575.7, 107, 121, 193.1, 78, 80, 455/82–83, 87–88, 73, 132–133, 266, 455/269, 334, 307, 339; 343/700, 702, 343/768, 770, 833–834, 876
See application file for complete search history.

(56) References Cited

U.S. PATENT DOCUMENTS

| | | | | |
|---|---|---|---|---|
| 5,594,394 A | * | 1/1997 | Sasaki et al. | 333/103 |
| 5,748,054 A | * | 5/1998 | Tonegawa et al. | 333/104 |
| 5,822,684 A | * | 10/1998 | Kitakubo | 455/78 |
| 6,195,559 B1 | * | 2/2001 | Rapeli et al. | 455/500 |
| 6,351,628 B1 | * | 2/2002 | Leizerovich et al. | 455/83 |
| 6,434,372 B1 | * | 8/2002 | Neagley et al. | 455/106 |
| 6,643,497 B1 | * | 11/2003 | Kouyama | 455/83 |
| 6,728,517 B2 | * | 4/2004 | Sugar et al. | 455/73 |
| 6,774,857 B2 | * | 8/2004 | Frank | 343/702 |
| 6,963,758 B2 | * | 11/2005 | Narahashi et al. | 455/561 |
| 7,075,386 B2 | * | 7/2006 | Kearns | 333/103 |
| 7,142,829 B2 | * | 11/2006 | Sung et al. | 455/101 |
| 7,164,330 B2 | * | 1/2007 | Eom | 333/161 |
| 7,233,775 B2 | * | 6/2007 | De Graauw | 455/78 |
| 7,280,333 B2 | * | 10/2007 | Horsky et al. | 361/93.1 |
| 7,286,808 B2 | * | 10/2007 | Sugiyama et al. | 455/275 |
| 7,307,490 B2 | * | 12/2007 | Kizuki et al. | 333/103 |
| 7,403,082 B2 | * | 7/2008 | Kearns | 333/126 |
| 7,412,210 B2 | * | 8/2008 | Okuyama | 455/78 |
| 7,596,357 B2 | * | 9/2009 | Nakamata et al. | 455/78 |
| 7,756,488 B2 | * | 7/2010 | Watanabe et al. | 455/78 |
| 7,839,234 B2 | * | 11/2010 | Prikhodko et al. | 333/103 |
| 7,847,740 B2 | * | 12/2010 | Dunn et al. | 343/702 |
| 7,848,712 B2 | * | 12/2010 | Fu et al. | 455/80 |

(Continued)

FOREIGN PATENT DOCUMENTS

| | | | | |
|---|---|---|---|---|
| JP | 08307297 | A | * | 11/1996 |
| JP | 2000049649 | A | * | 2/2000 |
| JP | 2001119222 | A | * | 4/2001 |

*Primary Examiner* — Pablo Tran
(74) *Attorney, Agent, or Firm* — Schwegman Lundberg & Woessner, P.A.

(57) ABSTRACT

The present invention relates to various embodiments of a Radio-Frequency (RF) front-end for use in a receiver, a diversity receiver and a method for operating a diversity receiver.

21 Claims, 4 Drawing Sheets

(56) References Cited

U.S. PATENT DOCUMENTS

| | | | |
|---|---|---|---|
| 7,885,613 B2* | 2/2011 | Kemmochi | H04B 1/006 455/78 |
| 7,956,704 B1* | 6/2011 | Acimovic | 333/181 |
| 8,660,603 B2* | 2/2014 | Block | H04B 1/006 370/276 |
| 9,065,506 B2* | 6/2015 | Uejima | H04B 1/006 |
| 9,209,775 B2* | 12/2015 | Ebihara | H03H 7/465 |
| 9,484,608 B2* | 11/2016 | Yamaguchi | H01P 1/10 |
| 2005/0245201 A1* | 11/2005 | Ella et al. | 455/78 |
| 2006/0189277 A1* | 8/2006 | Ranta et al. | 455/78 |
| 2010/0081407 A1* | 4/2010 | Adler et al. | 455/307 |

* cited by examiner

RADIO-FREQUENCY FRONT-END AND RECEIVER

FIELD OF THE INVENTION

The present invention relates to various embodiments of a Radio-Frequency (RF) front-end for use in a receiver, a diversity receiver and a method for operating a diversity receiver.

BACKGROUND

In wireless communication, information is transmitted using a radio communication channel. To perform the transmission, a useful signal comprising the information is modulated on a RF carrier signal to produce a modulated RF signal and fed by an antenna into the radio communication channel. The modulated RF signal propagates through the radio communication channel and is subsequently received as received RF signal by a receiver apparatus. The receiver apparatus is disposed to process the received RF signal in order to reconstruct the useful signal.

Current trends in mobile communication are facing industry with a demand of high data rate applications. These may be, e.g., video telephony, video or network games, streaming multimedia, web browsing, etc. In consequence, telecommunication devices are being arranged for multi-band and/or multi-mode operation. Communication standards allowing for a high data rate transmission, such as HSDPA (High Speed Downlink Packet Access) or HSUPA (High Speed Uplink Packet Access) are being developed within the established UMTS (Universal Mobile Telecommunication System) or W-CDMA (Wideband Code Division Multiple Access) standard. Other standards are defined by WLAN (Wireless Local Area Network) within IEEE 811.11 or by WIMAX.

High data rate usually require for a good signal quality in a receiver apparatus, i.e. a relatively high Signal-to-Noise-Ratio (SNR) in a receiver chain of both, a terminal device—such as a mobile phone—and in a base-station. With increasing distance between a transmitter apparatus and a receiver apparatus, the received RF signal may be distorted with respect to the modulated RF signal.

If the terminal device is close to the edge of a cell surrounding a base-station, reception quality in the receiver apparatus is limited by thermal noise and a noise figure of the receiver apparatus itself. Furthermore, the received RF signal is distorted by a noise figure of the radio communication channel, which is caused by mechanism such as Rayleigh fading, thermal noise of other electronic devices, man-made noise, e.g., caused by automobile ignition, any natural noise, e.g., electric discharges, such as lightning, etc.

A possible solution to achieve high data rate would by an increase of a number of base-stations, so to minimize a maximum distance between a terminal device and a base-station. Yet, this requires a high financial investment into a base-station infrastructure.

Another possible solution is an increase of the number of reception paths in the receiver apparatus. In consequence, a more accurate reconstruction of the useful signal may be achieved. This concept is also denoted as "diversity receiver". A diversity receiver usually requires a number of internal components in the receiver chain, and it is desirable to reduce that number to provide for a simple and more cost-efficient architecture of a diversity receiver.

For these and other reasons, there is a need for the present invention.

SUMMARY

The following presents a simplified summary of the invention in order to provide a basic understanding of some aspects of the invention. This summary is not an extensive overview of the invention, and is intended neither to identify key or critical elements of the invention nor to delineate the scope of the invention. Rather, the purpose of the summary is to present some concepts of the invention in a simplified form as a prelude to the more detailed description that is presented later.

In one embodiment of the invention, an RF front-end comprises a first antenna port coupled to a first output terminal. A switch has an input, a first output, and a second output. A second antenna port couples to the input. A terminal load couples to the first output. A second output terminal couples to the second output.

Related methods of operation are also provided. Other embodiments, methods, features and advantages will be or become apparent to one skilled in the art upon examination of the following figures and detailed description. It is intended that all such additional embodiments, methods, features, and advantages be included within this description, be within the scope of this invention and be protected by the accompanying claims. Other embodiments of the invention and many of the intended advantages of the invention will be readily appreciated as they become better understood by reference to the following detailed description.

BRIEF DESCRIPTION OF THE DRAWINGS

The detailed description is described with reference to the accompanying figures. The accompanying figures are included to provide a further understanding of the invention, are incorporated in, and constitute a part of this specification. The drawings illustrate different embodiments of the invention and together with the description serve to explain the principles of the invention. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
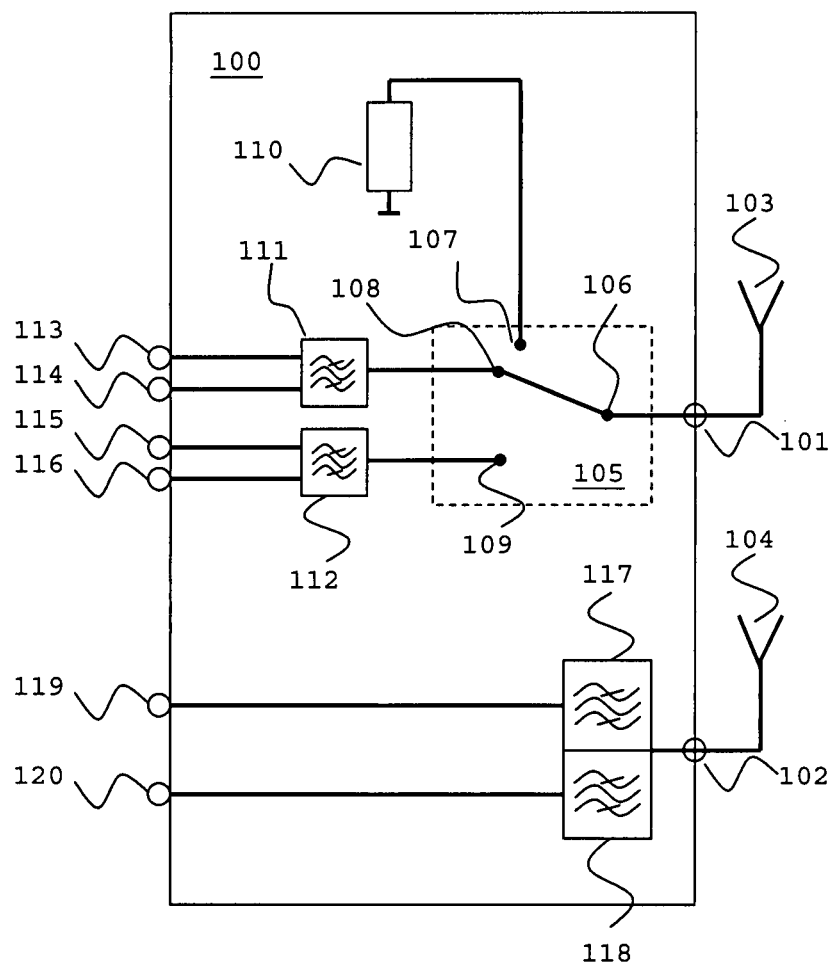
FIG. 1 is a block diagram illustrating an RF front-end embodiment of the invention.

FIG. 1 is a block diagram illustrating an RF front-end embodiment of the invention. An RF front-end 100 comprises a first input terminal 101 and a second input terminal 102. The first input terminal 101 couples to a first antenna 103. The second input terminal 102 couples to a second antenna 104. The shown embodiment illustrates both the first antenna 103 and the second antenna 104 arranged externally of the RF front-end 100. Yet in various other embodiments, the antennas may be embraced by the RF front-end 100.

The RF front-end 100 further comprises a switching unit 105 (represented in dashed lines). The switching unit 105 has an input 106 coupled to the first input terminal 101. It further has a first output 107, a second output 108, and a third output 109. In accordance to a chosen switching state, the switching unit 105 connects the input 106 to one of the first output 107, the second output 108, or the third output 109.

The first output 107 connects to an impedance 110, which is realized as resistor in the shown embodiment. In various other embodiments, different variations of the impedance 110 may be implemented including an inductor, a capacitance, or a circuitry including any of these elements. The impedance 110 may be a discrete semiconductor device or a circuitry of a plurality of devices. In some embodiments, the impedance 110 is realized by making use of planar spiral inductors, thin-film resistors, and parallel plate ferroelectric capacitors on a dielectric substrate. In various embodiments, it may be integrated in a single integrated semiconductor device with other or all components embraced by the RF front-end 100.

The second output 108 connects to a first filter element 111. The first filter element 111 may be realized as band-pass filter, as shown in the illustrated embodiment. The filter elements may be realized as micromechanical, SAW (Surface Acoustic Wave), BAW (Bulk Acoustic Wave) or as integrated filter, such as a LC circuitry. Circuitry may be integrated or molded completely or partly with other components of the RF front-end 100 in a single semiconductor device. In various other embodiments, different kind of filter elements, such as a low-pass filter or a high-pass filter, may be used alternatively. The first filter element 111 has a differential output that connects to a differential pair of a first output terminal 113 and a second output terminal 114.

The third output 109 connects to a second filter element 112. The second filter element 112 may be realized as band-pass filter, as shown in the illustrated embodiment. In various other embodiments, different kind of filter elements such as a low-pass filter or a high-pass filter may be used alternatively. The second filter element 112 has a differential output that connects to a differential pair of a third output terminal 115 and a fourth output terminal 116.

The second input terminal 102 couples to a diplexer including a pair of a third filter element 117 and a fourth filter element 118. The third filter element 117 and/or the fourth filter element 118 may be realized as band-pass filter, respectively, as shown in the illustrated embodiment. In various other embodiments, different kind of filter elements such as a low-pass filter or a high-pass filter may be used alternatively. The third filter element 117 connects to a fifth output terminal 119. The fourth filter element 118 connects to sixth output terminal 120.

In operation, the RF front-end 100 may be set to three different states. In a first switching state, the first input terminal 101 is coupled by the switching unit 105 to the first output 107. A signal received by the RF front-end 100 is sensed by the first antenna 103 and the second antenna 104. A first signal portion sensed by the second antenna 104 propagates via the diplexer to either the fifth output terminal 119 or the sixth output terminal 120 depending on the frequency band comprised by the first signal portion. Since the first input terminal 101 couples to the first output 107, a second signal portion sensed at the first antenna 103 is dissipated and/or reflected at the impedance 110.

The impedance 110 is chosen from short to open, so that a phase angle caused by the reflection allows for optimizing a mutual coupling between the two antennae. The first switching state allows for being set during a transmit mode of a transceiver embracing the RF front-end 100. Since the RF front-end 100 directly connects the filters and the diversity antennae, the filter elements are exposed to the power of the received signal. Due to mutual coupling of a transmit antenna, i.e. the second antenna 104, and the diversity antenna, i.e. the first antenna 103, filter elements will confronted with a high power level. This would result in setting higher requirements for power handling of the filter elements in a diversity reception path. In consequence, a general RF performance of the filter elements will be degraded causing e.g. an insertion loss. This scenario may be avoided by switching the RF front-end 100 to the first switching state during a transmit mode.

A cross talk is caused by inductance of a voltage in a reception path due to currents in an adjacent signal path. In order to reduce this inductance, the impedance 110 may be chosen such to reflect a signal wave incoming from the first antenna 103 so to attenuate the signal of the first reflection path. If a reflection at the impedance 110 involves a phase shift of 180°, attenuation will be at its maximum. The impedance 110 may be accordingly chosen in form of a 180° wideband phase shifter.

In a second switching state, the second input terminal couples to the second output 108, as illustrated in the example of FIG. 1. While the primary reception path is still operational as described with respect to the first switching state, the secondary reception path passes the second signal portion via the first filter element 111 to the differential pair of the first output terminal 113 and the second output terminal 114. The RF front-end 100 is operated for use as diversity receiver having two parallel reception paths.

In a third switching state, the second input terminal couples to the third output 109. While the primary reception path is still operational as described with respect to the first and the second switching state, the secondary reception path passes the received signal portion via the second filter element 112 to the differential pair of the third output terminal 115 and the fourth output terminal 116. The RF front-end 100 is operated for use as diversity receiver having two parallel reception paths.

The second switching state and the third switching state of the RF front-end 100 may differ with respect to a frequency band comprised by the received signal. To that purpose the first filter element 111 and the second filter element may differ with respect to each other, regarding their center frequency or with respect to their cut-off frequency.

The second switching state and the third switching state of the RF front-end 100 may also differ with respect to different kind of modulation of the received signal. It is possible that the two switching state may be chosen with respect to both, frequency band and modulation.

It is readily understood by one skilled in the art, that the RF front end 100 may be adapted to various other purposes. E.g., the switching unit 105 may include another number of outputs. It is also possible to include one or more additional reception paths in parallel to the primary or the secondary reception path. An additional reception path may be implemented in a similar manner as the secondary reception path, yet it may embrace any other implementation.

Figure 2:
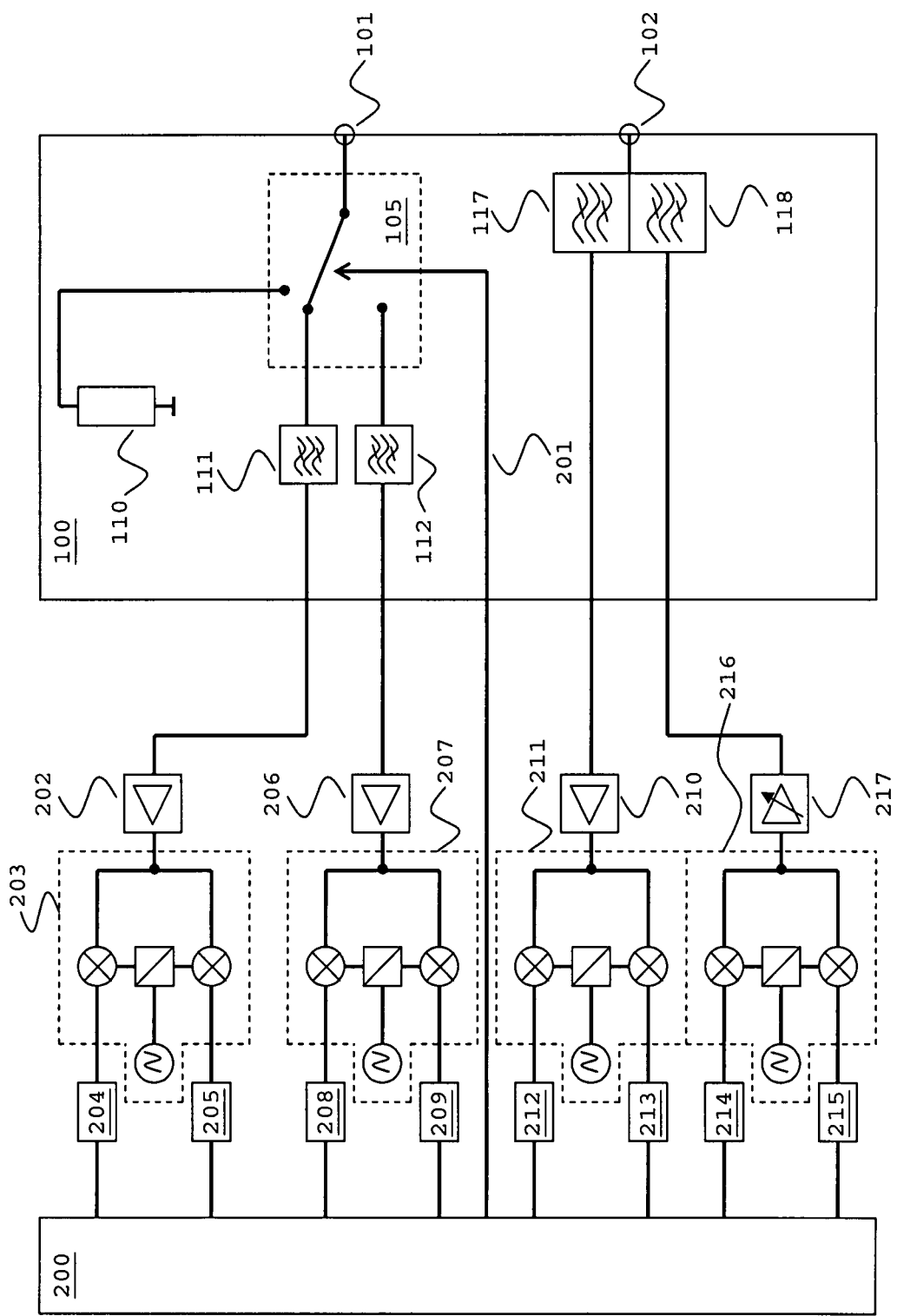
FIG. 2 is a block diagram illustrating a diversity receiver embodiment of the invention.

FIG. 2 is a block diagram illustrating a diversity receiver embodiment. The diversity receiver includes an RF front-end 100 and a base-band unit 200.

The base-band unit 200 may be any digital circuitry to process a digital base-band signal. It may be implemented as microprocessor or DSP (Digital Signal Processing) unit. In various other embodiment, the base-band unit 200 may be an interface unit, e.g. as defined by the Dig RF™ Standard, to allow for connecting the diversity receiver to an external base-band processor.

The RF front-end 100 has a first input terminal 101 and a second input terminal 102. The first input terminal 101 couples to a switching unit 105. According to a switching state of the switching unit 105, the first input terminal 101 selectively couples to an impedance 110, a first filter element 111, or a second filter element 112. The base-band unit 200 couples to the switching unit 105 by a control line 201. A switching state of the switching unit 105 is set by a switching signal generated by the base-band unit 200 and passed via the control line 201 to the switching unit 105.

The first filter element 111 couples to a first amplifier 202. The first amplifier 202 compensates for attenuation of a received signal in the preceding signal path. It may be implemented as LNA (Low Noise Amplifier) so to allow for avoiding degradation of the SNR. The first amplifier 202 couples to a first Cartesian Demodulator 203 (shown is dashed lines). The first Cartesian Demodulator 203 demodulates the received signal into baseband, i.e. it shifts the frequency of the received signal by the carrier frequency or a frequency close to the carrier frequency. The first Cartesian Demodulator 203 couples via a first ADC (Analog-to-Digital Converter) 204 and a second ADC 205 to the base-band unit 200. Thus, the base-band unit 200 receives a digital Cartesian representation, i.e. a digital Inphase signal and Quadrature signal, of the demodulated signal.

The second filter element 112 couples to a second amplifier 206. The second amplifier 206 compensates for attenuation of a received signal in the preceding signal path. It may be implemented as LNA. The second amplifier 206 couples to a second Cartesian Demodulator 207 (shown is dashed lines). The second Cartesian Demodulator 207 demodulates the received signal into baseband. It couples via a third ADC 208 and a fourth ADC 209 to the base-band unit 200.

The second input terminal 102 couples to a diplexer including a pair of a third filter element 117 and a fourth filter element 118. The third filter element 117 couples to a third amplifier 210. The third amplifier 210 compensates for attenuation of a received signal in the preceding signal path. It may be implemented as LNA. The third amplifier 210 couples to a third Cartesian Demodulator 211 (shown is dashed lines). The third Cartesian Demodulator 211 demodulates the received signal into baseband. It couples via a fifth ADC 212 and a sixth ADC 213 to the base-band unit 200. Thus, three parallel reception paths are arranged for.

The base-band unit 200 couples via a first DAC (Digital-to-Analog Converter) 214 and a second DAC 215 to a Cartesian Modulator 216. The Cartesian Modulator 216 couples via a fourth amplifier 217 to the fourth filter element 118. The fourth amplifier 217 may be a PGC (Programmable Gain Controlled) amplifier. This part of the receiver embodiment corresponds to a transmit path.

To cover different frequency bands, it is advantageous to have diverse parallel reception paths as shown in the embodiment of FIG. 2. In an exemplary case, the first filter element 111 would be a band pass filter having a pass band of 960 MHz to 869 MHz. The second filter element 112 would be a band pass filter having a pass band of 1990 MHz to 1805 MHz. The third filter element would be a band pass filter having a pass band of 2170 MHz to 2110 MHz. In other embodiments, additional or less reception paths may be provided allowing for the reception of other operating bands, or allowing for a different allocation of a reception path to a finer or coarser operating band.

Though the embodiment has been explained with reference to Cartesian modulation and demodulation, other forms of modulation, such as e.g. polar modulation, may be used as well.

Figure 3:
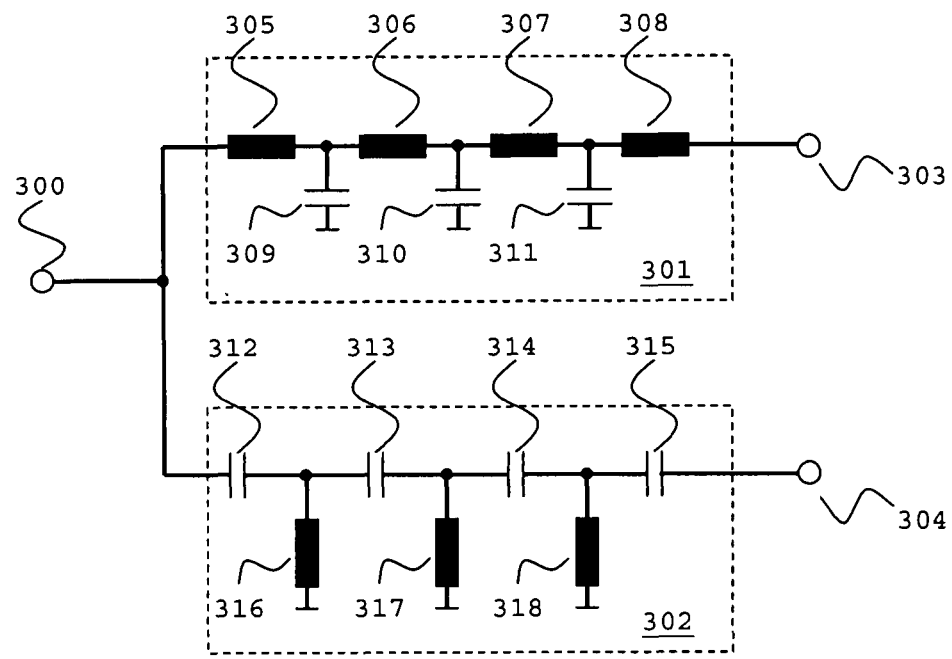
FIG. 3 is a block diagram illustrating an exemplary diplexer for use in an embodiment of the invention.

FIG. 3 is a block diagram illustrating an exemplary diplexer for use in an embodiment of the invention. The diplexer has an input 300 that couples to a low-pass filter 301 and to a high-pass filter 302. The low-pass filter 301 couples to a first diplexer output 303. The high-pass filter 302 couples to a second diplexer output 304. The low-pass filter 301 includes a circuitry of a first inductance 305, a second inductance 306, a third inductance 307, and a fourth inductance 308. A first shunt capacitance 309 is provided between the first inductance 305 and the second inductance 306. A second shunt capacitance 310 is provided between the second inductance 306 and the third inductance 307. A third shunt capacitance 311 is provided between the third inductance 307 and the fourth inductance 308. Thus, a low-pass filter of seventh order is provided for. Yet it readily is understood by one skilled in the art, that any other filter element, such as a low-pass filter of higher or lower order may be provided instead.

The high-pass filter 302 includes a circuitry of a first capacitance 312, a second capacitance 313, a third capacitance 314, and a fourth capacitance 315. A first shunt inductance 316 is provided between the first capacitance 312 and the second capacitance 313. A second shunt inductance 317 is provided between the second capacitance 313 and the third capacitance 314. A third shunt inductance 318 is provided between the third capacitance 314 and the fourth capacitance 315. Thus, a high-pass filter of seventh order is provided for. Yet it readily is understood by one skilled in the art, that any other filter element, such as a high-pass filter of higher or lower order may be provided instead.

The diplexer may be used for separating receive bands from transmit bands. If the diversity receiver embodiment is used in a mobile terminal of a mobile communication system, such as e.g. UMTS, the receive band is also denoted as "downlink" frequencies. The transmit band is denoted as "uplink" frequencies. If the diversity receiver embodiment is used in a base station of the mobile communication system, the receive band would correspond to an uplink situation, while the transmit band would correspond to a downlink situation. Uplink and downlink frequency bands are usually separated distinctly. E.g. in UMTS (25.101 UTRAN FDD) the bands are defined as follows:

| Operating Band | Uplink band (MHz) | Downlink band (MHz) |
| --- | --- | --- |
| I | 1920-1980 | 2110-2170 |
| II | 1850-1910 | 1930-1990 |
| III | 1710-1785 | 1805-1880 |
| IV | 1710-1755 | 2110-2180 |
| V | 824-849 | 869-894 |
| VI | 830-840 | 875-885 |
| VII | 2500-2570 | 2620-2690 |
| VIII | 880-915 | 925-960 |
| IX | 1750-1785 | 1845-1880 |

Figure 4:
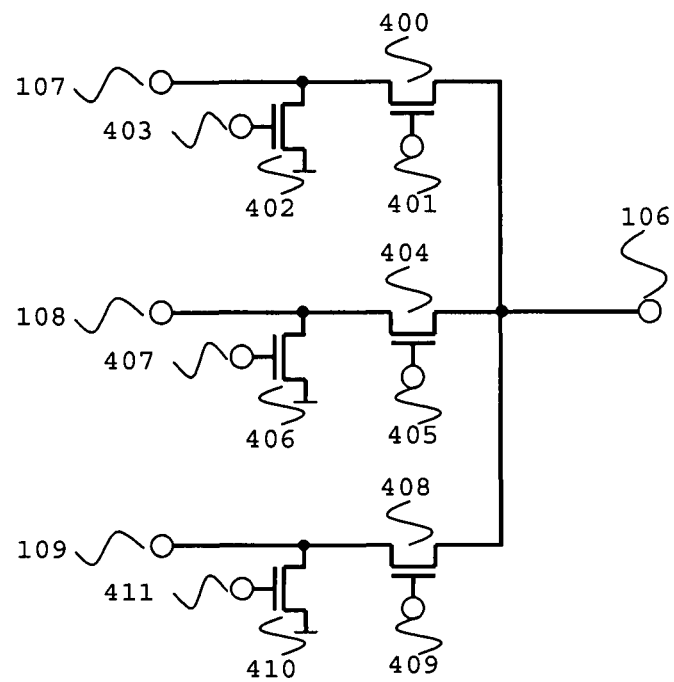
FIG. 4 is a block diagram illustrating an exemplary switching unit for use in an embodiment of the invention.

FIG. 4 is a block diagram illustrating an exemplary switching unit for use in an embodiment of the invention. The switching unit may be arranged as switching unit 105 in one of the shown embodiments of FIG. 1 or of FIG. 2. The switching unit has an input 106, a first output 107, a second output 108, and a third output 109. The input 106 connects via a source-drain connection of a first series transistor 400 to the first output 107. A gate terminal of the first series transistor 400 connects to a first control input 401. Between the first series transistor 400 and the first output 107, a first shunt transistor 402 is arranged. A gate terminal of the first shunt transistor 402 connects to a second control input 403. The input 106 further connects via a source-drain connection of a second series transistor 404 to the second output 108. A gate terminal of the second series transistor 404 connects to a third control input 405. Between the second series transistor 404 and the second output 108, a second shunt transistor 406 is arranged. A gate terminal of the second shunt transistor 406 connects to a fourth control input 407. The input 106 further connects via a source-drain connection of a third series transistor 408 to the third output 109. A gate terminal of the third series transistor 408 connects to a fifth control input 409. Between the third series transistor 408 and the third output 109, a third shunt transistor 410 is arranged. A gate terminal of the third shunt transistor 410 connects to a sixth control input 411.

Several control voltages are provided at the first control input 401, the second control input 403, the third control input 405, the fourth control input 407, the fifth control input 409, and at the sixth control input 411, respectively. These voltages may be provided by a control unit, such as the baseband unit 200 shown in FIG. 2. In various embodiments, the control voltages provided may correspond to a bit-like form. In these cases, a control voltage may either take a high potential corresponding to logic "1" or a low potential corresponding to a logic zero. A control voltage provided at the gate terminal of a series transistor is usually inverse to a control voltage provided at the gate terminal of a shunt transistor of the same signal path. A control voltage provided at the gate terminal of a series transistor is usually as well inverse to control voltages provided at gate terminals of series transistors in other signal paths. In consequence, three states of control voltages may be arranged to allow for three different switching states:

| V1 | V2 | V3 | V4 | V5 | V6 | Input 106 connects to: |
|---|---|---|---|---|---|---|
| high | Low | low | high | low | high | first output 107 |
| low | High | high | low | low | high | second output 108 |
| low | High | low | high | high | low | Third output 108 |

In this chart, V1 corresponds to the control voltage applied at the first control input 401. V2 corresponds to the control voltage applied at the second control input 403. V3 corresponds to the control voltage applied at the third control input 405. V4 corresponds to the control voltage applied at the fourth control input 407. V5 corresponds to the control voltage applied at the fifth control input 409, and V6 corresponds to the control voltage applied at the sixth control input 411, respectively.

Consequently, in a state of connecting the input 106 to one of the outputs 107, 108, or 109, the series transistor of the respective signal path is on, while the shunt transistor is off. This allows for signal provided at the input to pass on to the chosen output At the same time in all other signal paths the series transistor is off, while the shunt transistor is on. A signal provided at the input is thus blocked from being passed to the other outputs. The gate widths of the series transistors are chosen alike. The gate widths of the shunt transistors are chosen alike, as well. Yet, the values may differ, e.g. with respect to an optimal implementation with respect to a defined bass-band of a signal path. The gate widths of the series transistors are chosen in relation to the gate widths of the shunt transistors to achieve a trade-off between insertion loss in on-mode and isolation in off-mode. Low insertion loss may be achieved by choosing a larger gate width of the series transistor in comparison to the gate width of the shunt transistor. Opposite constraints may allow for a good isolation in off-mode.

Though the switching unit has been shown with regard to a CMOS implementation, is readily understood by one skilled in the art, that similar implementation may be achieved by using different semiconductor technologies, such as a Bipolar process, or by other diverse technologies, such as radio tubes, triodes, etc.

Figure 5:
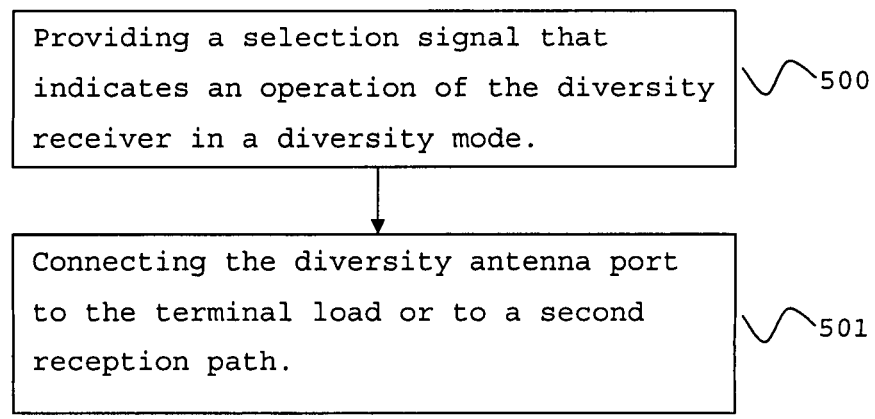
FIG. 5 is a flow diagram illustrating a process of operating a diversity receiver.

FIG. 5 is a flow diagram illustrating a process for operating a diversity receiver. The method includes a first step 500 of providing a selection signal that indicates an operation of the diversity receiver in a diversity mode In a second step 501, a diversity antenna port is connected to a terminal load or to a second reception path. The terminal load is chosen from short to open with any phase angle to optimize the mutual coupling between antennae of the diversity receiver.

CONCLUSION

Although the invention has been shown and described with respect to different embodiments, equivalent alterations and modifications will occur to others skilled in the art upon the reading and understanding of this specification and the annexed drawings. For example, although various embodiments of the invention are directed towards a wireless application of the same, in other embodiments, other suitable applications, such as a wireline and/or optical application can be addressed. In regard to the various functions performed by the above described components or circuits, terms used to describe such components are intended to correspond, unless otherwise indicated, to any component which performs the specified function of the described component (i.e., that is functionally equivalent), even though not structurally equivalent to the disclosed structure which performs the function in the exemplary embodiments of the invention. Terms such as "connected" should be interpreted to mean either directly connected or indirectly connected. Terms such as "coupled" should be interpreted to mean either directly coupled or indirectly coupled. Furthermore, to the extent that the term "includes" is used in either the detailed description or the claims, such term is intended to be inclusive in a manner similar to the term "comprising." While a particular feature of the invention may have been disclosed with respect to only one of several embodiments of the invention, such a feature may be combined with one or more other features of the other embodiments as may be desired and advantageous for any given or particular application.

What is claimed is:

1. Front-end circuitry for a diversity receiver, the front-end circuitry comprising:
   a primary signal path comprising:
      a first primary path filter;
      a second primary path filter; and
      a diplexer to couple RF signals between a primary antenna port and the first and second primary path filters,
   a secondary signal path comprising:

a first secondary path filter;

a second secondary path filter; and switching circuitry to couple RF signals from a secondary antenna port to either the first secondary path filter or the second secondary path filter during diversity reception mode operation, and to an impedance during transmit mode operation, the primary antenna port configured to be coupled with a primary antenna, the secondary antenna port configured to be coupled with a secondary antenna.

2. The front-end circuitry of claim 1 wherein a control signal is to configure the switching circuitry for operation in one of a first switching state, a second switching state and a third switching state, the switching circuitry configured in the first switching state for the transmit mode operation, the switching circuitry configured in either the second or third switching state for the diversity reception mode operation, wherein during the transmit mode operation, the front-end circuitry is configured to transmit RF signals with the primary antenna port, and wherein during diversity reception mode operation, the front-end circuitry is configured to receive RF signals simultaneously through both the primary antenna port and the secondary antenna port.

3. The front-end circuitry of claim 2, wherein during the transmit mode operation when the switching circuitry is configured in the first switching state, mutually coupled RF signals transmitted by the primary antenna port that are received through the secondary antenna port are coupled to the impedance, the impedance configured to reflect and/or attenuate the mutually coupled RF signals.

4. The front-end circuitry of claim 3 further comprising the primary antenna coupled to the primary antenna port, and the secondary antenna coupled to the secondary antenna port, wherein the impedance is selected to minimize mutual coupling between primary and secondary antennas during transmit mode operation.

5. The front-end circuitry of claim 4 wherein the primary signal path is configured without a switch between the primary antenna port and the first and second primary path filters, and wherein the secondary signal path is configured without a diplexer between the secondary antenna port and the secondary path filters.

6. The front-end circuitry of claim 4 wherein during diversity reception mode operation when the switching circuitry is configured in the second switching state:

RF signals received through the secondary antenna port are coupled to the first secondary path filter to provide a differential output within a first receive frequency band for subsequent processing;

RF signals received through the primary antenna port are provided to the first primary path filter to provide a non-differential output within the first receive frequency band for subsequent processing.

7. The front-end circuitry of claim 6 wherein the first secondary path filter and the first primary path filter are band pass filters having a pass-band corresponding to the first receive frequency band.

8. The front-end circuitry of claim 7 wherein during diversity reception mode operation when the switching circuitry is configured in the third switching state-RF signals received through the secondary antenna port are coupled to the second secondary path filter to provide a differential output within a second receive frequency band for subsequent processing; and RF signals received through the primary antenna port are provided to the second primary path filter to provide a non-differential output within the second receive frequency band for subsequent processing, wherein the second secondary path filter and the second primary path filter are band pass filters having a pass-band corresponding to the second receive frequency band.

9. The front-end circuitry of claim 8 wherein the diplexer is configured to separate RF signals in the first and second receive frequency bands from RF signals to provide RF signals of the first receive frequency band to the first primary path filter and to provide RF signals of the second receive frequency band to the second primary path filter.

10. The front-end circuitry of claim 9 wherein the receiver is configured for operation in accordance with an IEEE 802.11 standard, and wherein the first and second receive frequency bands correspond to IEEE 802.11 frequency bands.

11. The front-end circuitry of claim 9 wherein the receiver is configured for FDD operation, the first and second receive frequency bands comprise UMTS downlink frequency bands.

12. The front-end circuitry of claim 11 wherein during transmit mode operation, the primary antenna port is configured for transmission of RF signals within UMTS uplink frequency bands corresponding to UMTS downlink frequency bands.

13. The front-end circuitry of claim 6 wherein the diplexer is configured to:

separate RF signals within one or more receive frequency bands from RF signals within one or more transmit frequency bands, provide the RF signals in the one or more receive frequency bands received from the primary antenna port to the first primary path filter; and provide RF signals within one or more transmit frequency bands from the second primary path filter to the primary antenna port.

14. The front-end circuitry of claim 1 wherein the impedance comprises a terminal load coupled to circuitry to cause the terminal load to have a predetermined electrical characteristic to minimize mutual coupling between primary and secondary antennas during transmit mode operation.

15. The front-end circuitry of claim 14 wherein the switching circuitry comprises a first output to couple to the terminal load, the first output comprising a first series transistor coupled to have a source-drain connection between an input of the switching circuitry and the first output and a first shunt transistor coupled between the first series transistor and the first output, wherein the switching circuitry comprises a second output to couple to the first secondary path filter, the second output comprising a second series transistor coupled to have a source-drain connection between the input and the second output and a second shunt transistor coupled between the second series transistor and the second output, and wherein the switching circuitry comprises a third output to couple to the second secondary path filter, the third output comprising a third series transistor coupled to have a source-drain connection between the input and the third output and a third shunt transistor coupled between the third series transistor and the third output.

16. Front-end circuitry for a diversity receiver, the front-end circuitry comprising:

a primary signal path to receive RF signals from a primary antenna port, the primary signal path including a diplexer; and a secondary signal path to receive RF signals from a secondary antenna port, the secondary signal path including switching circuitry, wherein the switching circuitry is configured in a first switching state for transmit mode operation for transmission RF signals by the primary antenna port, wherein the switching circuitry is configured in a second switching state for diversity reception mode operation for reception of RF signals through both the primary antenna port and the secondary antenna port, wherein the diplexer is configured to separate signals in transmit and receive frequency bands, and wherein during the transmit mode operation when the switching circuitry is configured in the first switching state, mutually coupled RF signals transmitted by the primary antenna port that are received through the secondary antenna port are coupled to an impedance for at least one of reflection or attenuation.

17. The front-end circuitry of claim 16 wherein during diversity reception mode operation, the secondary signal path provides differential output signals of either a first or second receive frequency band.

18. The front-end circuitry of claim 17 further comprising a primary antenna coupled to the primary antenna port, and a secondary antenna coupled to the secondary antenna port, wherein the impedance is selected to minimize mutual coupling between primary and secondary antennas during transmit mode operation.

19. The front-end circuitry of claim 18 wherein the primary signal path is configured without a switch between the primary antenna port and first and second primary path filters, and wherein the secondary signal path is configured without a diplexer between the secondary antenna port and secondary path filters.

20. A method for diversity reception performed by front-end circuitry of a diversity receiver, the method comprising:

receiving RF signals in a primary signal path from a primary antenna port, the primary signal path including a diplexer; and receiving RF signals in a secondary signal path from a secondary antenna port, the secondary signal path including switching circuitry, configuring the switching circuitry in a first switching state for transmit mode operation for transmission RF signals by the primary antenna port, configuring the switching circuitry in a second switching state for diversity reception mode operation for reception of RF signals through both the primary antenna port and the secondary antenna port, and separating signals, by the diplexer, in transmit and receive frequency bands, and during the transmit mode operation when the switching circuitry is configured in the first switching state, coupling mutually coupled RF signals to an impedance for at least one of reflection or attenuation, the mutually coupled RF signals transmitted by the primary antenna port and received through the secondary antenna port.

21. The method of claim 20 further comprising the secondary signal path providing differential output signals of either a first or second receive frequency band during diversity reception mode operation.

* * * * *

UNITED STATES PATENT AND TRADEMARK OFFICE
CERTIFICATE OF CORRECTION

PATENT NO.         : 9,755,681 B2
APPLICATION NO.    : 11/861291
DATED              : September 5, 2017
INVENTOR(S)        : Wilhelm et al.

Page 1 of 1

It is certified that error appears in the above-identified patent and that said Letters Patent is hereby corrected as shown below:

In the Claims

In Column 9, Line 63, in Claim 8, delete "state-RF" and insert --state: RF-- therefor In Column 10, Line 37, in Claim 13, delete "filter;" and insert --filter,-- therefor Signed and Sealed this
Twenty-fourth Day of April, 2018

Andrei Iancu
*Director of the United States Patent and Trademark Office*